United States Patent [19]

Wu et al.

[11] Patent Number: 4,463,138

[45] Date of Patent: Jul. 31, 1984

[54] HIGH MOLECULAR WEIGHT POLY(VINYL ACETATE) AND POLY(VINYL ALCOHOL) AND PROCESSES FOR THEIR PRODUCTION

[75] Inventors: Tse C. Wu, Morristown; James C. West, Dover, both of N.J.

[73] Assignee: Allied Corporation, Morris County, Morris Township, N.J.

[21] Appl. No.: 429,941

[22] Filed: Sep. 30, 1982

[51] Int. Cl.³ ............................................. C08F 18/04
[52] U.S. Cl. .................................... 526/319; 525/56; 525/62; 204/159.23
[58] Field of Search ................... 526/319; 525/56, 62; 204/159.23

[56] References Cited

FOREIGN PATENT DOCUMENTS 663529  5/1963  Canada .
900571  7/1962  United Kingdom .

OTHER PUBLICATIONS

Atkinson et al., European Polymer Journal, vol. 15, pp. 21-26 (1979).

Hobbs et al., Journal of Polymer Science, vol. XXII, pp. 123-135 (1956).

Burnett et al., Journal of Polymer Science, vol. XVI, pp. 31-44 (1955).

Matsumoto et al., Journal of Polymer Science, vol. XLVI, pp. 520-523 (1960).

*Primary Examiner*—Paul R. Michl
*Assistant Examiner*—A. H. Walker
*Attorney, Agent, or Firm*—Alan M. Doernberg; Kenneth E. Stroup, Jr.; Gerhard H. Fuchs

[57] ABSTRACT

An improved poly(vinyl acetate) which on hydrolysis and reacetylation has an intrinsic viscosity of at least about 5 dL/g and an improved poly(vinyl alcohol) which on acetylation yields poly(vinyl acetate) having an intrinsic viscosity of at least about 5 dL/g. Such poly(vinyl acetate) can be prepared by photo-initiated free radical bulk polymerization of vinyl acetate with controlled low initiator concentration, polymerization temperature and reaction time. Such poly(vinyl alcohol) can be prepared by conventional alcoholysis of the poly(vinyl acetate).

15 Claims, No Drawings

HIGH MOLECULAR WEIGHT POLY(VINYL ACETATE) AND POLY(VINYL ALCOHOL) AND PROCESSES FOR THEIR PRODUCTION

DESCRIPTION

BACKGROUND OF THE INVENTION

The present invention relates to ultra-high molecular weight poly(vinyl acetate) and ultra-high molecular weight poly(vinyl alcohol). Poly(vinyl acetate) and poly(vinyl alcohol) produced in accordance with this invention have an essentially linear polymeric backbone. Additionally, the invention includes a novel process for production of the ultra-high molecular weight polymers.

Poly(vinyl alcohol) is conventionally produced in a two step process. The initial step comprises polymerizing vinyl acetate to produce poly(vinyl acetate). The second step comprises subjecting the poly(vinyl acetate) to alcoholysis (methanolysis or ethanolysis) in order to convert the poly(vinyl acetate) to poly(vinyl alcohol).

Canadian Pat. No. 663,529 discloses essentially linear poly(vinyl acetate) having an intrinsic viscosity of 1.7 to 3.2 dL/g. Accordingly, based upon numerical calculations, the poly(vinyl acetate) of Canadian Pat. No. 663,529 has a viscosity average molecular weight ranging from about 640,000 to about 1,500,000. Alcoholysis of the poly(vinyl acetate) of Canadian Pat. No. 663,529 would produce poly(vinyl alcohol) having a viscosity average molecular weight ranging from about 327,000 to about 765,000.

United Kingdom Pat. No. 900,571 discloses poly(vinyl alcohol) having the molecular structure

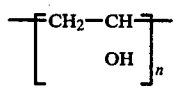

where n is the average degree of polymerization with n being 4,700. The poly(vinyl alcohol) of United Kingdom Pat. No. 900,571 has a viscosity average molecular weight of about 202,000, and the corresponding poly(vinyl acetate) of United Kingdom Pat. No. 900,571 has a viscosity average molecular weight of about 404,000.

Some investigators indicate that production of essentially linear poly(vinyl acetate) requires a polymerization temperature below about $-15°$ C. Atkinson et al., European Polymer Journal, Vol. 15 pp 21–26 (1979); Hobbs et al., Journal of Polymer Science, Vol. XXII, pp. 123–135, 124 (1956); Burnett et al., Journal of Polymer Science, Vol. XVI, pp. 31–44, 39 (1955). Hobbs et al. disclose at page 125 the preparation of an essentially linear poly(vinyl acetate) having an intrinsic viscosity of 3.11. In order to produce this polymer, Hobbs et al. employed azobisisobutyronitrile as an initiator at a concentration of $2.33 \times 10^{-4}$ moles per liter and allowed the polymerization to continue for 37.5 hours at a temperature of $-19°$ C.

Burnett et al. found that a polymerization temperature of $-25°$ C. to $-38°$ C. could be employed in order to obtain essentially linear poly(vinyl acetate). However, Burnett et al. noted that polymers prepared at $-38°$ C. had essentially the same molecular shape as those prepared at $-25°$ C. A contrary view is that the polymerization temperature is irrelevant and that essentially linear poly(vinyl acetate) may be obtained as long as the polymerization is not allowed to proceed to high conversions of the monomeric vinyl acetate. Matsumoto et al., Journal of Polymer Science, Vol. XLVI pp. 520–523 (1960).

Is is generally agreed that conversion of the monomer should be limited. This can be accomplished by controlling polymerization time, light intensity, initiator concentration and polymerization temperature. However, an optimum combination of these parameters is not known. Accordingly, one of the objects of the present invention is to provide a photoinitiated process for the production of essentially linear ultra-high molecular weight poly(vinyl acetate) which includes a novel combination of initiator concentration, polymerization temperature and length of polymerization time.

BRIEF DESCRIPTION OF THE INVENTION

The present invention comprises:

a. an essentially linear poly(vinyl acetate) which upon alcoholysis and reacetylation has an intrinsic viscosity greater than about 5 dL/g, and b. an essentially linear poly(vinyl alcohol) which upon acetylation yields poly(vinyl acetate) having an intrinsic viscosity greater than about 5 dL/g.

Additionally, the present invention includes a process for the production of the above-described polymers. The process includes the photoinitiated polymerization of highly pure monomeric vinyl acetate wherein said process comprises a novel combination of initiator concentration, polymerization temperature, and length of polymerization. Thus, the invention includes a process for the photoinitiated free radical bulk polymerization of vinyl acetate wherein said process comprises:

a. employing a photochemical initiator at a concentration between about $1 \times 10^{-3}$ molar and about $1 \times 10^{-5}$ molar;

b. employing ultraviolet radiation to activate said initiator;

c. employing a polymerization temperature between about $-25°$ C. and about $-45°$ C.; and d. conducting said polymerization for a period of time between about 24 hours and about 120 hours.

DETAILED DESCRIPTION OF THE INVENTION

This invention relates to ultra-high molecular weight essentially linear poly(vinyl acetate) and ultra-high molecular weight poly(vinyl alcohol) produced via alcoholysis of said poly(vinyl acetate).

In its simplest form, poly(vinyl acetate) may be represented as follows by structure I:

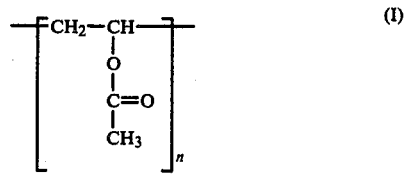

wherein n is the degree of polymerization (i.e. number of repeat units). Upon alcoholysis, structure I is converted to poly(vinyl alcohol) which may be represented as follows by structure II:

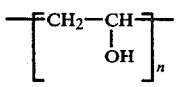 (II)

wherein n is as described for structure I.

It should be appreciated, however, that poly(vinyl acetate) having a structure corresponding to structure I is most dufficult to obtain by bulk polymerization procedures. The difficulty is associated with the fact that during vinyl acetate polymerization, a hydrogen may be abstracted from the alpha, beta or methyl carbon of the acetate group to produce radical sites capable of combining with other vinyl acetate monomers to form a chain. Such combinations result in poly(vinyl acetate) which contains extended branches and, of course, is non-linear. Branching at the alpha and beta carbons is known to occur much less frequently than branching at the methyl carbon of the acetate group, and such branching is not considered a major problem. However, branching at the methyl group of the acetate side group is somewhat common under certain conditions and will/may lead to poly(vinyl acetate) having a significant number of branch points according to structure III which is as follows:

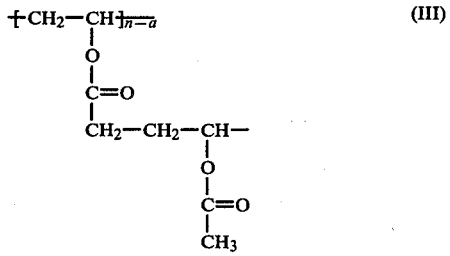 (III)

Even worse, the branching mechanism may continue further to produce branch points represented by structure IV as follows:

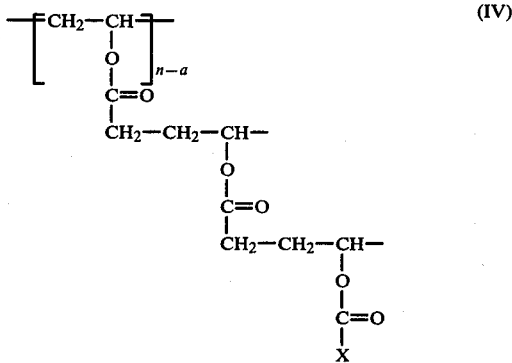 (IV)

wherein X is CH$_3$ (termination of branching) of CH$_2$— (further branching). In structures III and IV above n is as previously described hereinabove, and a is the number of unbranched repeat units.

The occurrence of substantial branching during vinyl acetate polymerization is most undesirable if one desires to convert the poly(vinyl acetate) to poly(vinyl alcohol). In order to appreciate the undesirability of substantial branching, one must first appreciate that upon alcoholysis of poly(vinyl acetate) for the production of poly(vinyl alcohol), the acetate groups are cleaved from the backbone of the polymer. Thus, the molecular weight of poly(vinyl alcohol) will necessarily be about one half that of poly(vinyl acetate) due to the molecular weight of the repeat units for each polymer. The molecular weight of a poly(vinyl acetate) repeat unit is about 86, while the repeat unit of poly(vinyl alcohol) has a molecular weight of about 44. However, if a significant number of the acetate groups have attained greater length (i.e. greater molecular weight) via a branching mechanism, the poly(vinyl alcohol) produced by alcoholysis of the significantly branched poly(vinyl acetate) will have a molecular weight significantly less than one half the molecular weight of the poly(vinyl acetate). Therefore, in order to produce ultra-high molecular weight poly(vinyl alcohol), it is necessary that the number of extended branches contained by the precursor polymer, poly(vinyl acetate), be minimized as much as possible.

In order to determine whether significant branching has occurred during polymerization of vinyl acetate to poly(vinyl acetate), one must conduct the following procedures:

1. determine the molecular weight of the poly(vinyl acetate);
2. subject the poly(vinyl acetate) to alcoholysis (i.e. methanolysis or ethanolysis) in order to produce poly(vinyl alcohol);
3. reacetylate the poly(vinyl alcohol);
4. determine the molecular weight of the reacetylated poly(vinyl acetate); and
5. compare the molecular weights obtained by steps 1 and 4.

Determination of the molecular weight of poly(vinyl acetate) may be accomplished by any one of a number of techniques known to those skilled in the art. Illustrative examples of suitable means for conducting the molecular weight determination include light scattering techniques which yield a weight average molecular weight and intrinsic viscosity determinations which may be extrapolated to viscosity average molecular weights in accordance with the relationship $[\eta] = 5.1 \times 10^{-5} M^{0.791}$ described more fully by W. S. Park et al. in the *Journal of Polymer Science*, Polymer Physics Ed., vol. 15, p. 81 (1977).

The alcoholysis of step 2 above may be accomplished by initially dissolving the poly(vinyl acetate) in a quantity of a low molecular weight alcohol such as methanol or ethanol sufficient to form at least about a 2% solution of the poly(vinyl acetate) resin. Base or acid catalysis may then be employed in order to convert the poly(vinyl acetate) to poly(vinyl alcohol) which is produced in the form of a gel. Base catalysis is preferred, however, with suitable bases including potassium hydroxide, sodium hydroxide, sodium methoxide, potassium methoxide, etc. The gel material is then chopped into small pieces and extracted repeatedly with methanol, ethanol or water for removal of residual base salts. The essentially pure poly(vinyl alcohol) is then dried under vacuum at a temperature of about 30° C. to about 70° C. for about 2 to 20 hours.

The reacetylation of step 3 above may be accomplished by dissolving 0.2 grams of the poly(vinyl alcohol) in about 20 mL of a solution comprising about 1 part pyridine, about 15 parts acetic anhydride, and about 5 parts acetic acid and then heating the resultant mixture at about 120° C. for a period of time ranging from about 2 to about 20 hours. The reacetylated poly(- vinyl acetate) may then be recovered via standard procedures known to those skilled in the art such as precipitation into a non-solvent.

Insignificant branching in the original poly(vinyl acetate) will be evidenced by a reacetylated poly(vinyl acetate) having a molecular weight that approximates the molecular weight of the original poly(vinyl acetate). In other words, the closer the molecular weight determined by step 4 above is to the molecular weight determination of step 1 above, the more linear is the original poly(vinyl acetate).

Poly(vinyl acetate) produced in accordance with this invention has an instrinsic viscosity, and thus a corresponding molecular weight, which is only slightly higher than reacetylated poly(vinyl acetate) produced from poly(vinyl alcohol) resulting from alcoholysis of the original poly(vinyl acetate). Therefore, it is believed that poly(vinyl acetate) produced in accordance with this invention is essentially linear. Reacetylated poly(vinyl acetate) of this invention has an intrinsic viscosity which is greater than about 5 dL/g. This corresponds to a viscosity average molecular weight of about $2 \times 10^6$. Thus, given the fact that the repeat unit of poly(vinyl acetate) has a molecular weight of about 86 and the repeat unit of poly(vinyl alcohol) has a molecular weight of about 44, poly(vinyl alcohol) produced in accordance with this invention has a viscosity average molecular weight of at least about $1 \times 10^6$. In many preferred embodiments of this invention, the reacetylated poly(vinyl acetate)s of this invention have an intrinsic viscosity ranging from about 6 dL/g to about 9 dL/g. Poly(vinyl acetate) falling within this intrinsic viscosity range has a viscosity average molecular weight ranging from about $2.6 \times 10^6$ to about $4.4 \times 10^6$. Similarly, this invention includes poly(vinyl alcohol), however produced, which upon acetylation yields poly(vinyl acetate) having an intrinsic viscosity of at least about 5 dL/g. Thus, the invention in many preferred embodiments includes poly(vinyl alcohol), however produced, which upon acetylation yields poly(vinyl acetate) having an intrinsic viscosity ranging from about 6 dL/g to about 9 dL/g.

Poly(vinyl alcohol) produced in accordance with this invention is useful in the production of poly(vinyl alcohol) fibers of heretofore unobtainable strength. For example, fibers produced from the ultra-high molecular weight poly(vinyl alcohol) of this invention can have a tenacity of about 15 g/denier or higher. Also, fibers produced from the poly(vinyl alcohol) of this invention can have extremely high melting points which are at least about 245° C. Fibers produced from the ultra-high molecular weight poly(vinyl alcohol) of this invention and processes for their production are described more fully in the co-pending commonly assigned application of Kwon et al. U.S. Ser. No. 432,044, filed Sept. 30, 1982 and exemplified in Examples 7 and 8 below.

The process for the production of the ultra-high molecular weight essentially linear poly(vinyl acetate) of this invention requires that the starting material, the vinyl acetate monomer, have a purity greater than 99% and preferably greater than 99.9%. Small scale quantities of vinyl acetate having a purity greater than 99.9% may be obtained by fractionating a vinyl acetate monomer with a 200-plate spinning band column and collecting the middle boiling fraction at about 72.2° C. Large quantities of vinyl acetate having a purity greater than 99.9% for industrial production of ultra-high molecular weight poly(vinyl alcohol) may be obtained by standard industrial distillation procedures which are well known to those having skill in the art.

Polymerization of the vinyl acetate monomer is accomplished by photointiated radical polymerization. Process conditons and details will be discussed more fully below. Oxygen acts as an inhibitor of radical polymerization. Thus, it is necessary to further purify the fractionated highly pure vinyl acetate monomer by subjecting said monomer to deoxygenation procedures. This may be accomplished by a freeze-thaw operation under a high vacuum and an inert gas sweep wherein the monomer is frozen at about −93° C., thawed, refrozen, thawed, etc. The vinyl acetate monomer should undergo at least about three freeze-thaw cycles in order to insure an essentially complete removal of oxygen.

Once a purified and deoxygenated vinyl acetate monomer is obtained, the monomer may then be transferred to a suitable reactor for conducting the photoinitiated free radical bulk polymerization of this invention. Suitable reactors for conducting the polymerization process of this invention include any reactor constructed of a material such as Pyrex ® glass, quartz or other similar material which will allow passage of ultraviolet light of the desired wavelength. Suitable sources of ultraviolet light include conventional ultraviolet lamps and neodymium glass lasers or dye lasers. Suitable reactors will also be equipped with a temperature control means.

The polymerization should, of course, be conducted in the absence of oxygen. Although it is possible to initiate polymerization directly by utilizing gamma radiation or short wavelength ultraviolet light, the present process employs a photochemical initiator which is decomposed into free radicals by long wavelength ultraviolet light. Suitable initiators include azo compounds of the formula R—N=N—R which are decomposed into free radicals by ultraviolet light. The selection of suitable R groups is well within the skill of the art and appropriate selections would yield compounds such as azobisisobutyronitrile, azobiscyclohexane carbonitrile and azobispropane. Other suitable photochemical initiators include carbonyl compounds such as benzoin and benzil, and peroxides such as di-t-butyl peroxide and benzoyl peroxide. In many preferred embodiments of this invention, an initiator is employed from the above-listed compounds which is decomposed into free radicals by ultraviolet light in the 260 nm to 500 nm region. Azobisisobutyronitrile satisfies this criterion and is the preferred photochemical initiator for conducting the process of this invention.

The concentration of the initiator is critical in that we have discovered that very low initiator concentrations are one of the necessary requirements for production of the ultra-high molecular weight essentially linear poly(vinyl acetate)s of this invention. Initiator concentrations which are suitable for the process of this invention range from about $1 \times 10^{-5}$ molar to about $1 \times 10^{-3}$ molar with about $3 \times 10^{-5}$ molar to about $6 \times 10^{-5}$ molar being the preferred initiator concentration for conducting the process.

Reaction time or polymerization time is also critical. The time required to complete the polymerization process is somewhat lengthy. In general, the polymerization must be allowed to proceed for a period of time ranging from about 24 to about 120 hours. In many preferred embodiments of this invention, however, the optimal period of polymerization ranges from about 72 to about 105 hours with about 96 hours being especially preferred.

The final critical parameter for the polymerization process of this invention is the polymerization temperature. It is necessary to employ a low temperature in order to insure a relatively slow polymerization rate which will result in a low conversion of monomer to polymer. A low conversion of monomer to polymer may be defined as less than about 20% of the vinyl acetate monomer being converted to poly(vinyl acetate). In so limiting the conversion percentage by employing a low temperature, branching in the side chain acetate group will be essentially eliminated, and thus, the polymeric backbone of the poly(vinyl acetate) will be essentially linear. Temperatures which may be employed in the process of this invention in order to satisfy the above-described conversion factor are temperatures below about $-25°$ C. A suitable temperature range for accomplishing the above-described conversion objectives is from about $-25°$ C. to about $-45°$ C. with about $-30°$ C. to about $-40°$ C. being the preferred temperature range for conducting the process of this invention.

Upon completion of the polymerization process, unreacted vinyl acetate may be removed by distillation under atmospheric or sub-atmospheric pressures. A polymeric residue comprising poly(vinyl acetate) will remain in the vessel utilized for the removal of unreacted vinyl acetate. The poly(vinyl acetate) product may be worked up by initially dissolving the polymeric residue in an organic solvent such as acetone, tetrahydrofuran, methanol, dichloromethane, ethyl acetate, etc., and then precipitating the polymer with a non-solvent such as hexane, cyclohexanol, diethyl ether, mesitylene or the like. Similarly, precipitation of the polymers may be accomplished by simply employing cold water. Recovery of the polymer is then accomplished by standard filtration and drying procedures.

Conversion of the ultra-high molecular weight poly(vinyl acetate) to ultra-high molecular weight poly(vinyl alcohol) may be accomplished by conventional alcoholysis as described hereinabove.

EXAMPLES

Determination of Intrinsic Viscosities

Solution viscosities of two poly(vinyl acetate) resins were measured at various concentration levels in tetrahydrofuran at 25° C. The data was treated according to the following empirical viscosity-concentration relationship developed by Huggins:

$$\frac{\eta_{sp}}{C} = [\eta] + k'[\eta]^2 C$$

wherein ($\eta$sp/C) is the reduced viscosity =

$$\frac{\eta_s - \eta_o}{\eta_o C}$$

wherein $[\eta]$ is the intrinsic viscosity or the reduced viscosity in the limit of $C \to 0$ $$\left[ i.e. \left( \frac{\eta_{sp}}{C} \right) C \to 0 \right];$$

wherein $k'$ is Huggins constant; wherein C is the concentration in g/dL with $\eta_s$ being the solution viscosity and $\eta_o$ being the solvent viscosity.

Plots of the reduced viscosity versus concentration for the two poly(vinyl acetate) resins yielded intrinsic viscosity values of 1.35 dL/g and 2.9 dL/g and Huggins $k'$ ($k' = \text{slope}/[\eta]^2$) values of 0.26 and 0.31 respectively. Intrinsic viscosity values of all subsequent poly(vinyl acetate) samples (Examples 1-6 herein) were derived from single point viscosity measurements in polymer concentrations of 0.50 g/dL using an average Huggins $k'$ value of 0.30. This was accomplished by use of a quadratic to obtain $[\eta]$ from the following relationship:

$$k'[\eta]^2 C + [\eta] - \frac{\eta_{sp}}{C} = 0$$

Using the positive root of the quadratic yields $$[\eta] = \frac{-1 + \sqrt{1 + 4k'C \frac{\eta_{sp}}{C}}}{2k'C}$$

which reduces to $$[\eta] = \frac{-1 + \sqrt{1 + 0.6 \frac{\eta_{sp}}{C}}}{0.3}$$

when $k' = 0.3$ and $C = 0.5$ g/dL.

EXAMPLE 1

The polymerization reactor consisted of a Pyrex® cylindrical tube having a diameter of 50 mm and a height of 230 mm. The reactor had a tubular neck of 15 mm diameter topped with a vacuum valve. The reactor was placed in a vacuum jacketed Dewar flask filled with methanol as a coolant which was cooled by a CryoCool cc-100 immersion cooler (Neslab Instruments, Inc.). A medium pressure ultraviolet lamp was placed outside the Dewar flask about 75 mm from the reactor.

Commercial high purity vinyl acetate was refractionated in a 200-plate spinning band column. The middle fraction having a boiling point of about 72.2° C. was collected and used as the monomer for preparing poly(vinyl acetate). The monomer was purified further by five cycles of a freeze-thaw degassing process in a high vacuum. About three hundred grams of the purified and degassed vinyl acetate was transferred into the reactor which contained 14 mg of recrystallized azobisisobutyronitrile. The initiator concentration was about $8 \times 10^{-5}$M.

The reactor was immersed in a methanol bath having a controlled temperature of $-40°$ C. and irradiated with ultraviolet light over a period of 96 hours. The reaction mixture became a very viscous material. The unreacted monomer was distilled from the mixture under vacuum, leaving 87 grams of residue. The latter was dissolved in acetone and then precipitated into hexane. The polymer formed was dried in a vacuum oven at 50° C., yielding 54.3 grams (17% conversion) of poly(vinyl acetate). The intrinsic viscosity was determined to be 7.12 dL/g which corresponds to a viscosity average molecular weight of $3.2 \times 10^6$. The intrinsic viscosity measurement was conducted in tetrahydrofuran at 25° C.

Alcoholysis of the poly(vinyl acetate) was accomplished by initially dissolving and stirring the poly(vinyl acetate) in about one liter of methanol). To this mixture was added 2.5 g of potassium hydroxide dissolved in 50 mL of methanol. The mixtures was stirred vigorously at room temperature. After about 95 minutes, the mixture became a gel-like mass. The latter was chopped into small pieces and extracted three times with methanol for removal of residual potassium salts. The polymer was dried in a vacuum oven at 50° C., yielding 17.1 grams of poly(vinyl alcohol). The low yield resulted from the loss of part of the reaction mixture during alcoholysis, due to a broken reaction flask caused by the stirring apparatus.

Reacetylation was accomplished by heating a 0.3 gram sample of the poly(vinyl alcohol) in a solution containing 15 mL of acetic anhydride, 5 mL of glacial acetic acid, and 1 mL of pyridine in a 125° C. bath under nitrogen for 4 hours. The solution formed was precipitated into water, washed three times in water, redissolved in acetone, reprecipitated into hexane, and dried. The intrinsic viscosity of the reacetylated poly(vinyl acetate) was 6.67 dL/g which corresponds to a viscosity average molecular weight of about $3.0 \times 10^6$. Thus, the original poly(vinyl acetate) was essentially linear.

EXAMPLE 2

The polymerization was conducted according to the procedure described in Example 1 except that the initiator concentration was $2.8 \times 10^{-4}$ molar. The poly(vinyl acetate) obtained had an intrinsic viscosity of 6.22 dL/g which corresponds to a viscosity average molecular weight of about $2.7 \times 10^6$. The conversion of the original monomer was 16%. After alcoholysis to poly(vinyl alcohol) and reacetylation to poly(vinyl acetate), the intrinsic viscosity of the regenerated poly(vinyl acetate) was 6.52 dL/g.

COMPARATIVE EXAMPLE 3

The polymerization was conducted according to the procedure described in Example 1 except that the initiator concentration was $2.7 \times 10^{-4}$ molar, the temperature employed was −20° C., and the length of polymerization was 22 hours. Poly(vinyl acetate) having an intrinsic viscosity of 4.88 dL/g which corresponds to a viscosity average molecular weight of about $2.0 \times 10^6$ was obtained. The conversion of original monomer was 11.5%. After alcoholysis to poly(vinyl alcohol) and reacetylation to poly(vinyl acetate), the intrinsic viscosity of the regenerated poly(vinyl acetate) was 4.39 dL/g which corresponds to a viscosity average molecular weight of about $1.7 \times 10^6$.

EXAMPLE 4

The reactor employed in this Example was a quartz tube having a 1.5 liter capacity and 76 mm diameter. The ultraviolet apparatus was a Special Preparative Photochemical Reactor, RPR-208 (The Southern New England Ultraviolet Company, Hamden, Conn.). The reactor was immersed in a cooliing bath surrounded by eight U-shape UV lamps.

A dry, nitrogen filled quartz reactor of the above-described type was charged with 508 g of purified vinyl acetate and 6.5 mg of azobisisobutyronitrile. The initiator concentration was about $8 \times 10^{-5}$ molar. After four cycles of freeze-thaw operations the reactor was immersed in a methanol bath at −40° C. and irradiated with ultraviolet light for about 80 hours. After the unreacted monomer had been recovered via standard distillation procedures, the residue was dissolved in acetone forming 1.5 liters of solution. One half of the acetone solution was precipitated into hexane as described in Example 1, while the other half was precipitated into water. These two batches of poly(vinyl acetate) had intrinsic viscosities of 6.33 and 6.67 dL/g, respectively, which corresponds to viscosity average molecular weights of about $2.7 \times 10^6$ and about $2.9 \times 10^6$. The total conversion of monomer was 12%.

EXAMPLE 5

The polymerization was performed according to the procedure described for Example 4 except that the irradiation time (length of polymerization) was 96 hours. The conversion of monomeric vinyl acetate was 13.8% and the intrinsic viscosity was 7.26 dL/g, which corresponds to a viscosity average molecular weight of about $3.3 \times 10^6$. The weight average molecular weight of this polymer measured by a light scattering technique was found to be $3.6 \times 10^6$.

EXAMPLE 6

A mixture containing 4.6 mg of azobisisobutyronitrile and 762 grams of pure vinyl acetate was placed in a Pyrex ® glass reactor tube of 85 mm diameter and 430 mm length (capacity 2 liters). After four freeze-thaw cycles of degassing, the mixture was immersed in a methanol bath at −30° C. and irradiated with ultraviolet light for 66 hours. After the unreacted monomer had been removed, the residue was dissolved in acetone and the solution obtained was added to hexane with stirring whereby the poly(vinyl acetate) was precipitated. There was obtained 76.2 grams (10% conversion) of polymer with an intrinsic viscosity of 6.62 dL/g which corresponds to a viscosity average molecular weight of about $2.9 \times 10^6$.

The poly(vinyl acetate) was hydrolyzed in methanol as described in Example 1. A sample of the poly(vinyl alcohol) formed was reacetylated as described in Example 1. The intrinsic viscosity of the reacetylated polymer was found to be 6.52 dL/g which is corresponding to a molecular weight of about $2.9 \times 10^6$. Thus, reacetylation demonstrated that the poly(vinyl acetate) originally formed was essentially linear.

EXAMPLE 7

An oil-jacketed double helical (HELICONE ®) mixer constructed by Atlantic Research Corporation was charged with a 6.0 weight percent solution of the poly(vinyl alcohol) obtained from the methanolysis of poly(vinyl acetate) having an intrinsic viscosity of 6.24 dL/g as described in Example 2, above, and 94 weight percent glycerin. The charge was heated with agitation at 75 rev/min to 190° C. under nitrogen pressure over a period of two hours. After reaching 190° C., agitation was maintained for an additional two hours.

The solution was discharged into a syringe-type run extruder at the mixing temperature (190° C.) and expelled through a 0.8 mm diameter aperture at a reasonably constant rate of 0.7 cm³/min.

The extruded uniform solution filament was quenched to a gel state by passage through a paraffin oil bath located at a distance of 5 cm below the spinning die. The gel filament was wound up continuously on a 2.5 cm (one inch) diameter bobbin at the rate of 2.5 m/min (8 feet/min). The fibers were drawn at a feed rate of 260 cm/min and a 2.04:1 ratio at room temperature.

The bobbin of gel fiber was then immersed in methanol to exchange this second solvent for glycerin (and paraffin oil from the quench batch). The methanol bath was changed three times over 48 hours. The fibrous product containing methanol was unwound from the bobbin and the methanol solvent evaporated at 25° C. for 5 minutes.

The dried (xerogel) fiber was 370 denier. Part of this fiber was fed at 50 cm/min into a hot tube 180 cm (six feet) long blanketed with nitrogen and maintained at 230° C. The fiber was stretched continuously 4.9/1 within the hot tube. The once-stretched fiber was then stretched in the same tube 1.54/1 at 252° C. The properties of the twice-stretched fiber were:

denier—25
tenacity—17.4 g/denier
modulus—446 g/denier
elongation—3.3%

EXAMPLE 8

Example 7 was repeated using the poly(vinyl alcohol) obtained by hydrolyzing a poly(vinyl acetate) having an intrinsic viscosity of 6.57 dL/g (as described in Example 4) as a 6% solution in glycerol at 210° C. mixed over 5¼ hours. The spin rate was 0.4 cm³/min. The room temperature draw was at a feed rate of 310 cm/min and a 1.98:1 ratio and the extraction was conducted over 64 hours, with the methanol changed twice. The dried fibers were stretched once in the 180 cm tube at 254° C. with a 39 cm/min feed rate and a 4.6:1 draw ratio. The properties of the once-stretched fibers were:

denier—23
tenacity—19.2 g/denier
modulus—546 g/denier
elongation—4.5%

We claim:

1. An essentially linear poly(vinyl acetate) which upon alcoholysis and reacetylation has an intrinsic viscosity of at least about 6 dL/g (calculated from measurement of solution viscosity in tetrahydrofuran at 25° C.).

2. A poly(vinyl acetate) according to claim 1 wherein said intrinsic viscosity is between about 6 dL/g and about 9 dL/g.

3. An essentially linear poly(vinyl alcohol) which upon acetylation yields poly(vinyl acetate) having an intrinsic viscosity of at least about 5 dL/g (calculated from measurement of solution viscosity in tetrahydrofuran at 25° C.).

4. A poly(vinyl alcohol) according to claim 3 wherein said intrinsic viscosity is between about 6 dL/g and about 9 dL/g.

5. A process for the photoinitiated free radical bulk polymerization of vinyl acetate to produce an essentially linear poly(vinyl acetate) which upon alcoholysis and reacetylation has an intrinsic viscosity of at least about 5 dL/g (calculated from measurement of solution viscosity in tetrahydrofuran at 25° C.) wherein said process comprises:
   a. employing a photochemical initiator at a concentration between about $1 \times 10^{-3}$ molar and about $1 \times 10^{-5}$ molar;
   b. employing ultraviolet radiation to activate said initiator;
   c. employing a polymerization temperature between about $-25°$ C. and about $-45°$ C.; and
   d. conducting said polymerization for a period of time between about 24 hours and about 120 hours.

6. A process according to claim 5 wherein said initiator is an azo compound which is decomposed into free radicals upon being subjected to ultraviolet light.

7. A process according to claim 6 wherein said ultraviolet light has a wavelength of about 260 nm to about 500 nm.

8. A process according to claim 7 wherein said initiator is azobisisobutyronitrile.

9. A process according to claim 6 wherein said concentration is between about $3 \times 10^{-5}$ molar and about $6 \times 10^{-5}$ molar.

10. A process according to claim 9 wherein said concentration is about $5 \times 10^{-5}$ molar.

11. A process according to claim 5 wherein said time is between about 72 and about 105 hours.

12. A process according to claim 11 wherein said time is about 96 hours.

13. A process according to claim 5 wherein said temperature is between about $-30°$ C. and about $-40°$ C.

14. A process according to claim 13 wherein said temperature is about $-40°$ C.

15. A process according to claim 5 wherein said concentration is between about $3 \times 10^{-5}$ molar and about $6 \times 10^{-5}$ molar with said time being between about 72 and about 105 hours and said temperature is between about $-30°$ C. and about $-40°$ C.

* * * * *